Nov. 8, 1960     M. LANDMAN ET AL     2,959,251
AUXILIARY BUMPER-TYPE IMPACT ABSORBER
Filed June 12, 1957     2 Sheets-Sheet 1

INVENTORS
Max Landman
Joseph Newman
Herman Landman
BY
Munn, Liddy, Daniels, & March
ATTORNEYS Nov. 8, 1960        M. LANDMAN ET AL        2,959,251
AUXILIARY BUMPER-TYPE IMPACT ABSORBER
Filed June 12, 1957                    2 Sheets-Sheet 2
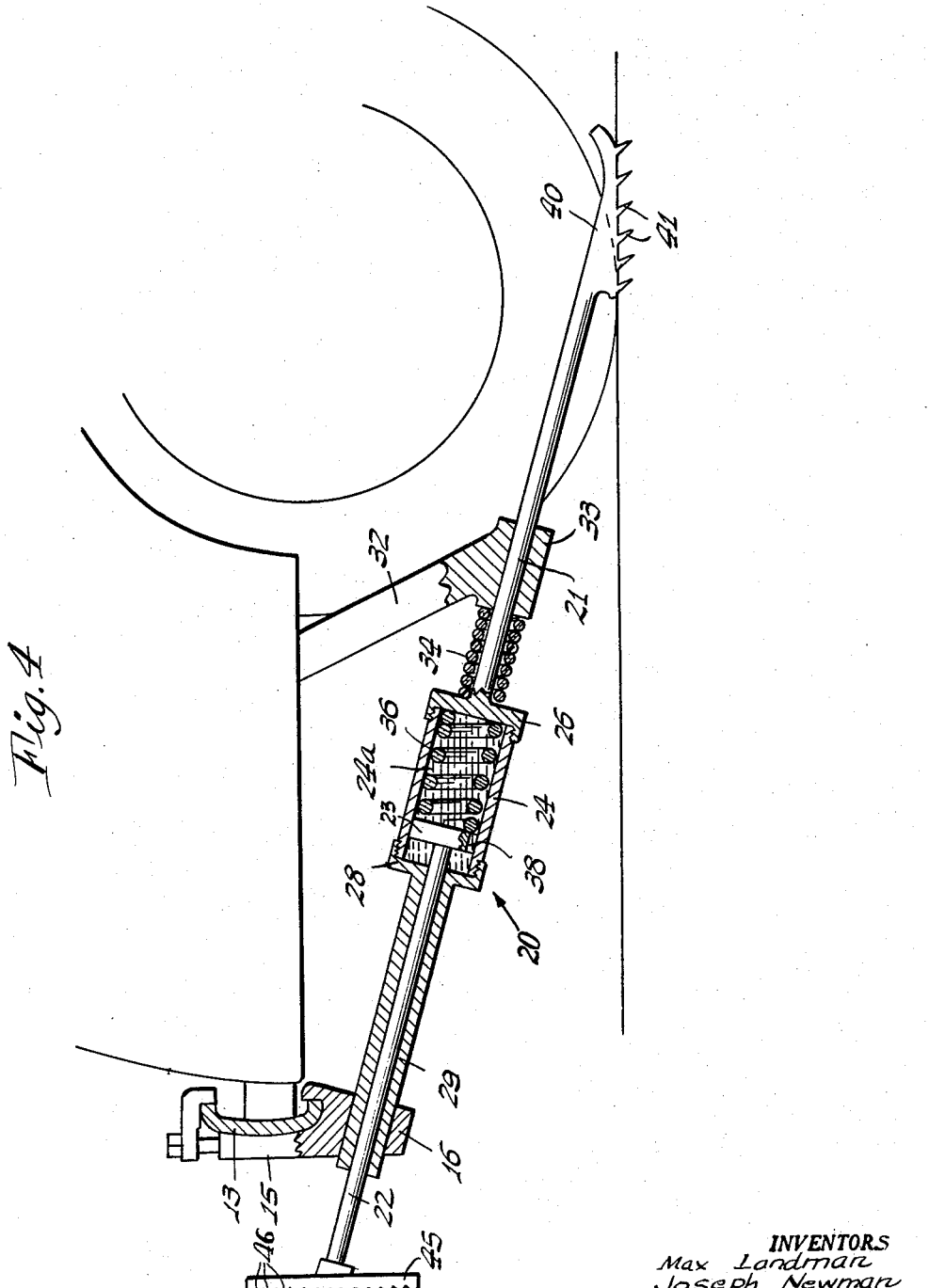
INVENTORS
Max Landman
Joseph Newman
BY Herman Landman
Munn, Liddy, Daniels & March
ATTORNEYS United States Patent Office 2,959,251
Patented Nov. 8, 1960

2,959,251

AUXILIARY BUMPER-TYPE IMPACT ABSORBER

Max Landman, 7816 226th St., Flushing, N.Y.; Joseph Newman, 191—06 37th Ave., Flushing, N.Y.; and Herman Landman, 4800 14th Ave., Brooklyn, N.Y.

Filed June 12, 1957, Ser. No. 665,298

4 Claims. (Cl. 188—5)

This invention relates to vehicle-carried devices for absorbing impact or shock, and more particularly to an impact-absorbing bumper for cushioning and absorbing the shock resulting from a vehicle which is at a standstill being struck by another vehicle.

The present invention relates to improvements in the impact-absorbing device described and claimed in our Patent Number 2,843,224 entitled, "Auxiliary Bumper Impact Absorber."

It often occurs that, due to a chain of unexpected events or some unusual circumstance, a vehicle which is at a standstill will be struck a considerable blow by a following vehicle. Sometimes such an accident is caused by a short stop of the first vehicle, while the attention of the driver of the second vehicle is diverted so that he does not notice the proximity of the car ahead until it is too late. In other circumstances where major accidents occur, there may be secondary or minor collisions due to short stops, faulty brakes and the like. The shock suffered by a vehicle at a standstill, when struck by a moving car, may be very considerable, and there have been many known instances where occupants of the motionless car suffered broken necks, dislocated vertebrae and the like. The impact-absorbing device of my prior-filed copending application above referred to is intended to reduce the shock suffered by such a motionless vehicle.

One object of the present invention is to provide a novel and improved, bumper-type impact-absorbing device which will be extremely effective in reducing the shock to a car at a standstill, when such car is struck by another vehicle.

A further object of the invention is to provide a novel and improved, impact-absorbing device as above characterized, which will at the same time halt the striking vehicle more gradually and with less damage and serious consequences to the same.

A still further object of the invention is to provide an improved, bumper-type impact-absorbing device which will be effective in minimizing shock and damage to both the striking and the struck vehicles, which device however is economical to fabricate and manufacture.

A feature of the invention resides in the provision of an improved, bumper-type impact absorbing device as above characterized, which is strong and sturdy in its construction, reliable in its operation, and not likely to get out of order in spite of being used over an extended period of time.

Yet another object of the invention is to provide a novel and improved, bumper-type impact-absorbing device which is so constituted as to be readily applied to a vehicle as an accessory item.

Other features and advantages will hereinafter appear.

In the drawings accompanying this specification, similar characters of reference indicate corresponding parts wherever possible in the several views, in which:

Fig. 4 is a view somewhat like Fig. 1, but showing the impact absorber in its road-engaging position and partially contracted.

Figure 1:
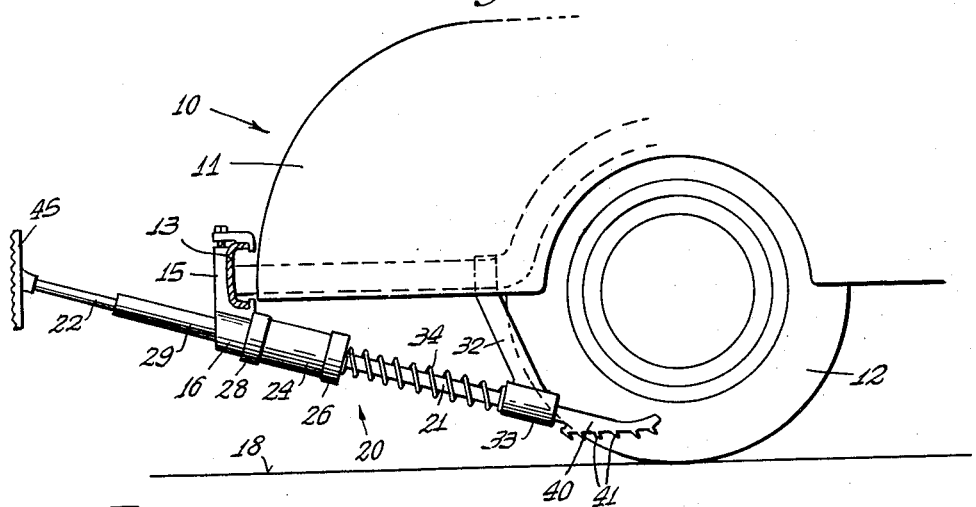
Fig. 1 is a side view of a vehicle chassis of the present invention partly in section showing the impact absorber of the present invention in its raised inoperative position.

Referring to Fig. 1, there is illustrated the rear portion 10 of a vehicle, having a rear fender 11 and wheel 12, and having the usual type of channel-section rear bumper 13 disposed approximately on the same level as the wheel centers.

As in my copending application referred to, the impact absorbing device of this invention is intended to be applied to one end, such as the rear portion of a vehicle, for the purpose of reducing the shock which the vehicle might suffer if, while motionless or moving at a slow rate of speed, it is struck by a fast moving vehicle.

Preferably as shown by the specific embodiment of the invention illustrated herein, the bumper-type impact-absorbing device is mounted on the rear bumper 13 of the vehicle. For this purpose I provide a plurality of sturdy, clamping means 15 which may be in the form of special C-clamps adapted to embrace and grip the upper and lower flanges of the bumper 13, as well as the rear face thereof. At their lower portions, the clamps 15 are provided with bearing collars 16 having bores directed angularly upward with respect to the road surface 18 on which the vehicle is supported. A pair of such clamps 15 may be advantageously provided, secured to the bumper 13 in widely spaced relation, as will be understood.

Figure 2:
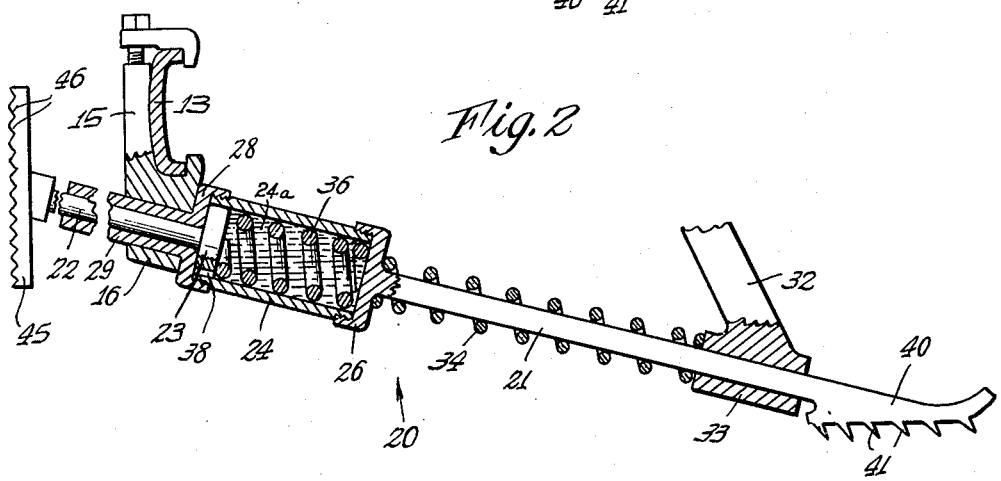
Fig. 2 is a longitudinal sectional view of the impact absorber of the present invention.

Each of the clamps 15 carries an elongate brake element 20 of novel and unique construction, one such element being illustrated in detail in Fig. 2. The element 20 shown therein comprises essentially a lower part 21, an upper part 22, and a piston and enclosing cylinder 23, 24 respectively, the piston being joined to the upper part 22 of the element and the cylinder 24 being carried by the lower part 21.

It will be understood that the association of the piston and cylinder with the respective upper and lower parts as set forth herein is for illustrative purposes, and that a reversal of the cylinder and piston is possible, without departing from the scope of the invention.

The cylinder 24 may be advantageously constituted of a length of metal tubing, with threaded ends, the lower end of the tubing being accommodated in a cap 26 joined to the lower, rod-like part 21 of the brake element. The upper threaded end of the cylinder 24 may be accommodated in a cap 28 joined to an elongate sleeve bearing 29 in which the upper rod-like part 22 of the brake element is longitudinally movable. In turn, the sleeve bearing 29 may be movably carried in the bearing collar 16 so as to be longitudinally slidable therein.

Supplementing the mounting clamps 15, we further provide mounting brackets 32 secured in any suitable manner to the chassis of the vehicle, each such mounting bracket having a bearing collar 33 in which the lower portion 21 of the brake element is longitudinally movable. A helical coil spring 34 carried by said lower portion 21 engages the bearing collar 33 and the cap 26, and normally maintains the brake element 20 in a raised, releasing or non-braking position, as illustrated in Fig. 1.

Within the cylinder 24 we provide a helical compression spring 36, adapted for engagement with the piston 23 to thereby maintain the upper portion 22 of the brake element extended, as shown in Fig. 2. It will be understood, therefore, that with this organization the brake assemblage is contractile, that is, the upper part 22 and piston 23 may be shifted downward and to the right whereby the piston more fully enters the cylinder 24, compressing the spring 36. To provide a damping action for such contractile movement, the cylinder 24 may be filled with a suitable fluid or liquid 24a, as for example oil, and an escape port or notch 38 may be provided in the piston 23 to allow the oil to bypass the latter at a slow rate volumetrically.

Figure 3:
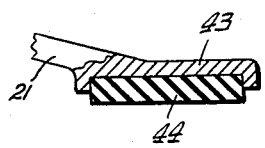
Fig. 3 is a sectional view of a modified form of the road engaging shoe of the present invention.

Further, in accordance with the invention, we provide on the lower portion 21 on the brake element 20 an anti-skid or anti-friction means by which the road surface 18 will be securely gripped at such time that the braking element is shifted downward to the braking position from the inoperative position illustrated in Fig. 1. Referring to Fig. 2 the lower part 21 of the braking element may have a road-engaging shoe 40 provided with angularly extended teeth 41 adapted to become imbedded in the road to surface. In Fig. 3 we provide a road engaging shoe 43 provided with a rubber or rubber-like pad 44 having a high coefficient of friction, by which slippage on the road surface 18 is minimized. Referring to Fig. 2 we provide on each of the upper parts 22 of the brake elements an enlarged head or plate 45 disposed generally in a vertical plane, and preferably employ blunt or squat, pyramidal teeth 46 on such plate, to reduce the likelihood of slippage when a moving body strikes the plate.

The operation of the improved, impact-absorbing device of this invention is as follows: Normally the device is in the position shown in Figs. 1 and 2, with the compression coil springs 34 and 36 extended, maintaining the brake element 20 in a raised, non-braking position and also in an extended condition. The movement-damping fluid in the cylinder 24 will be disposed substantially wholly below or to the right of the piston 23 as seen in Fig. 2. If the vehicle 11 should be struck in the rear, the striking vehicle would first engage the bumper plates 45 of the brake elements 20, since these are disposed at the proper level, and have sufficient height to insure such engagement. The blow would cause each of the brake elements 20 including the piston 23 and cylinder 24 initially to move independently as a unit downward and to the right, causing the road-engaging shoe 40 thereof to strike and frictionally seize the road surface 18, and with such movement the cylinders 24 of the assemblages 20 are also shifted downward and to the right, moving away from the bearing collars 16 of the clamps 15. This will cause a certain amount of compression of the springs 34. After the shoes 40 engage the road there would be continued movement of the upper parts 22 of the brake elements, but at a retarded rate, and such movement would be damped but still permitted by the fluid within the cylinders 24, such fluid bypassing the pistons 23 in limited quantities and permitting such pistons to continue their downward movements to the right. That is, considering Fig. 2, each piston 23 will now shift downward and to the right, compressing the spring 36 in the cylinder 24, and causing the fluid 24a in the cylinder to pass through the notch 38 of the piston at a rate which effectively damps the downward movement of the part 22. We thus accomplish a two-fold advantageous result with the above organization. The shock which is suffered by the struck vehicle 11 will be greatly minimized, due to the force of the striking vehicle being transmitted directly to the road 18 through the brake elements 20. At the same time, the assuming of such force by the brake elements 20 involves a fluid cushioning action by virtue of the provision of the cylinders 24 and pistons 23, and therefore the shock suffered by the striking vehicle is to some extent lessened and softened. Accordingly, with the employment of my improved bumper-type impact absorber there is effected a protective action for both the struck and the striking vehicles.

Moreover, it will be readily appreciated that the structure of the brake elements 20 is relatively simple, sturdy and reliable, and provides for foolproof operation under even adverse condition of use.

Variations and modifications may be made within the scope of the claims, and portions of the improvements may be used without others.

We claim:

1. The combination with a mobile vehicle, of a road-surface-contacting, elongate, angularly disposed bumper-type brake element having upper and lower parts, said element being carried by the vehicle at one end thereof, said element being disposed at all times with its axis at an angle to the vertical and to the horizontal; means slidably mounting said element on the vehicle for raising and lowering movement, said element moving at all times longitudinally in a straight line between a lowered, braking, road-engaging position and a raised, non-braking position free of the road; resilient means yieldably holding said brake element in its raised, non-braking position; a head on the upper end of the upper part of the brake element, said head being disposed outside of the vehicle body and beyond the outermost end portion of the vehicle for engagement by a colliding vehicle to cause downward movement of the brake element into its braking position; and anti-skid means on the lower end of the lower parts of the brake element, for engaging the road surface and minimizing slippage of the brake element thereon when the latter is in lowered, braking position, said brake element being longitudinally contractile, said element further comprising relatively movable piston and cylinder members on the said upper and lower parts respectively, said cylinder member containing the piston member and being disposed at an angle to the horizontal which is the same as the angle of the brake element with respect to the horizontal, and the upper end of the cylinder member having an opening through which the piston rod passes, said cylinder member being rigid with the said lower part of the brake element and the piston member being rigid with the said upper part of the brake element; spring means normally holding the piston member in the upper end of the cylinder member; means providing for passage of fluid at a limited rate past the piston member as force is applied to the latter to shift it in the cylinder member, said piston and cylinder members thereby providing a fluid-cushion effect in response to said contraction of the brake element.

2. The combination with a mobile vehicle, of a road-surface-contacting, elongate, angularly disposed bumper-type brake element having upper and lower parts, said element being carried by the vehicle at one end thereof, said element being disposed at all times with its axis at an angle to the vertical and to the horizontal; means slidably mounting said element on the vehicle for raising and lowering movement, said element moving at all times longitudinally in a straight line between a lowered, braking, road-engaging position and a raised, non-braking position free of the road; resilient means yieldably holding said brake element in its raised, non-braking position; a head on the upper end of the upper part of the brake element, said head being disposed outside of the vehicle body and beyond the outermost end portion of the vehicle for engagement by a colliding vehicle to cause downward movement of the brake element into its braking position; and anti-skid means on the lower end of the lower part of the brake element, for engaging the road surface and minimizing slippage of the brake element thereon when the latter is in lowered, braking position, said brake element being longitudinally contractile, said element further comprising relatively movable piston and cylinder members on the said upper and lower parts respectively, said cylinder member containing the piston member and being disposed at an angle to the horizontal which is the same as the angle of the brake element with respect to the horizontal, and the upper end of the cylinder member having an opening through which the piston rod passes, said cylinder member being rigid with the said lower part of the brake element and the piston member being rigid with the said upper part of the brake element; including a notch in the piston member, providing for passage of fluid at a limited rate past the piston member as force is applied to the latter to shift it in the cylinder member, said piston and cylinder member thereby providing a fluid-cushion effect in response to said contraction of the brake element.

3. The combination with a mobile vehicle, of a road-surface-contacting, elongate, angularly disposed bumper-type brake element having upper and lower parts, said element being carried by the vehicle at one end thereof, said element being disposed at all times with its axis at an angle to the vertical and to the horizontal; means slidably mounting said element on the vehicle for raising and lowering movement, said element moving at all times longitudinally in a straight line between a lowered, braking, road-engaging position and a raised, non-braking position free of the road; resilient means yieldably holding said brake element in its raised, non-braking position; a head on the upper end of the upper part of the brake element, said head being disposed outside of the vehicle body and beyond the outermost end portion of the vehicle for engagement by a colliding vehicle to cause downward movement of the brake element into its braking position; and anti-skid means on the lower end of the lower part of the brake element, for engaging the road surface and minimizing slippage of the brake element thereof when the latter is in lowered, braking position, said brake element being longitudinally contractible, said element further comprising relatively movable piston and cylinder members on the said upper and lower parts respectively, said cylinder member containing the piston member and being disposed at an angle to the horizontal which is the same as the angle of the brake element with respect to the horizontal, and the upper end of the cylinder member having an opening through which the piston rod passes, said cylinder member being rigid with the said lower part of the brake element and said piston member being rigid with the said upper part of the brake element; spring means normally holding the piston member in the upper end of the cylinder member; means providing for passage of fluid at a limited rate past the piston member as force is applied to the latter to shift it in the cylinder member, said piston and cylinder members thereby providing a fluid-cushion effect in response to said contraction of the brake element; and bearing means connected with said lower part of the brake element, for effecting a slidable mounting of the latter on the vehicle.

4. The combination with a mobile vehicle, of a road-surface-contacting, elongate, angularly disposed bumper-type brake element having upper and lower parts, said element being carried by a vehicle at one end thereof, said element being disposed at all times with its axis at an angle to the vertical and to the horizontal; means slidably mounting said element on the vehicle for raising and lowering movement, said element moving at all times longitudinally in a straight line between a lowered, braking, road-engaging position and a raised, non-braking position free of the road; resilient means yieldably holding said brake element in its raised, non-braking position; a head on the upper end of the upper part of the brake element, said head being disposed outside of the vehicle body and beyond the outermost end portion of the vehicle for engagement by a colliding vehicle to cause downward movement of the brake element into its braking position; and anti-skid means on the lower end of the lower part of the brake element, for engaging the road surface and minimizing slippage of the brake element thereon when the latter is in lowered, braking position, said brake element being longitudinally contractile, said element further comprising relatively movable piston and cylinder members on the said upper and lower parts respectively, said cylinder member containing the piston member and being disposed at an angle to the horizontal which is the same as the angle of the brake element with respect to the horizontal, and the upper end of the cylinder member having an opening through which the piston rod passes, said cylinder member being rigid with the said lower part of the brake element and said piston member being rigid with the said upper part of the brake element, spring means normally holding the piston member in the upper end of the cylinder member; means providing for passage of fluid at a limited rate past the piston member as force is applied to the latter to shift it in the cylinder member, said piston and cylinder members thereby providing a fluid-cushion effect in response to said contraction of the brake element; and bearing means connected with said lower part of the brake element, for effecting a slidable mounting of the latter on the vehicle, said resilient means comprising a spring carried by said lower part of the brake element and engaged with said cylinder member and bearing means.

References Cited in the file of this patent

UNITED STATES PATENTS

| | | |
|---|---|---|
| 847,941 | Haywood | Mar. 19, 1907 |
| 1,102,932 | Lautenbacher et al. | July 7, 1914 |
| 1,183,107 | Norton | May 16, 1916 |
| 1,287,065 | Maguire | Dec. 10, 1918 |
| 1,442,401 | Grigas | Jan. 16, 1923 |
| 1,495,916 | McNanes | May 27, 1924 |
| 1,619,823 | Klein | Mar. 8, 1927 |
| 2,147,451 | Messina | Feb. 14, 1939 |
| 2,630,961 | Burg | Mar. 10, 1953 |
| 2,843,224 | Landman et al. | July 15, 1958 |